United States Patent
Kani et al.

(10) Patent No.: US 11,364,652 B2
(45) Date of Patent: Jun. 21, 2022

(54) PORTABLE CUTTING MACHINE (71) Applicant: MAKITA CORPORATION, Anjo (JP)

(72) Inventors: Toshiyuki Kani, Anjo (JP); Hiromu Goto, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 16/937,657

(22) Filed: Jul. 24, 2020

(65) Prior Publication Data

US 2021/0060811 A1 Mar. 4, 2021

(30) Foreign Application Priority Data

Sep. 3, 2019 (JP) .............................. JP2019-160408

(51) Int. Cl.
*B27G 19/04* (2006.01)
*B27B 5/29* (2006.01)
*B23D 45/16* (2006.01)
*B27G 19/02* (2006.01)

(52) U.S. Cl.
CPC ............. *B27G 19/04* (2013.01); *B23D 45/16* (2013.01); *B27B 5/29* (2013.01); *B27G 19/02* (2013.01)

(58) Field of Classification Search
CPC .......... B27B 5/29; B23D 45/16; B27G 19/02; B27G 19/04; Y10T 83/7734; Y10T 83/606; B26B 25/00; B26D 7/22
USPC .................................................... 30/390, 391
See application file for complete search history.

(56) References Cited

U.S. PATENT DOCUMENTS

| 1,738,896 | A | * | 12/1929 | Hansen | B27G 19/04 30/391 |
| 1,811,577 | A | * | 6/1931 | Crowe | B27G 19/04 30/391 |
| 1,813,231 | A | * | 7/1931 | Crowe | B27G 19/04 30/377 |
| 2,722,246 | A | * | 11/1955 | Arnoldy | B27G 19/04 30/391 |

(Continued)

FOREIGN PATENT DOCUMENTS

| DE | 1052104 B | * | 3/1959 | ............ B27G 19/04 |
| DE | 1086036 B | * | 7/1960 | ............ B27G 19/04 |

(Continued)

OTHER PUBLICATIONS

DE-1052104-B English Traslation ; Mar. 1959 ; Kaltenmark Otto B27G19/04.*

(Continued)

*Primary Examiner* — Laura M Lee
(74) *Attorney, Agent, or Firm* — Oliff PLC (57) ABSTRACT

An operation member has a higher degree of design freedom in, for example, the position and the amount of displacement of an operation part, and the force used for operation. A portable cutting machine includes a base, an electric motor, a blade rotatable by the electric motor, a movable cover covering a lower part of the blade protruding downward from the base and rotatable to be open, an operation lever located frontward from a rotation center of the blade and rotatable, and a transmission lever rotatable to push and open the movable cover when pushed by the operation lever.

14 Claims, 10 Drawing Sheets

(56) References Cited

U.S. PATENT DOCUMENTS

| | | | | |
|---|---|---|---|---|
| 2,963,056 A * | 12/1960 | Rickford | ............... | B27G 19/04 83/391 |
| 3,063,481 A * | 11/1962 | Sutherland | ............. | B27G 19/04 30/391 |
| 3,701,369 A * | 10/1972 | Gronke | ................. | B27G 19/04 30/371 |
| 3,706,332 A * | 12/1972 | George | ................. | B27G 19/04 30/391 |
| 3,730,239 A * | 5/1973 | Kaman | ..................... | B27B 9/02 30/391 |
| 3,733,701 A * | 5/1973 | Lubas | ...................... | B27B 9/00 30/391 |
| 3,787,973 A * | 1/1974 | Beisch | .................. | B27G 19/04 30/391 |
| 4,589,208 A * | 5/1986 | Iwasaki | .................... | B27B 9/02 30/376 |
| 4,672,746 A * | 6/1987 | Zeilenga | ................ | B27G 19/04 30/391 |
| 4,856,394 A * | 8/1989 | Clowers | .............. | B23D 59/006 83/56 |
| 5,129,300 A * | 7/1992 | Kawakami | ............ | B27G 19/02 30/391 |
| 5,832,614 A * | 11/1998 | Gallagher | .............. | B27G 19/04 30/391 |
| 5,873,169 A * | 2/1999 | James | .................... | B27G 19/04 30/391 |
| 5,918,522 A * | 7/1999 | Benedict | ............... | B27G 19/02 83/478 |
| 2005/0252012 A1* | 11/2005 | Johnson, III | .......... | B27G 19/04 30/391 |

FOREIGN PATENT DOCUMENTS

| | | | | |
|---|---|---|---|---|
| EP | 2062699 A2 * | 5/2009 | ............. | B27G 19/04 |
| JP | S5860410 U * | 10/1981 | ............. | B27G 19/04 |
| JP | S62-162003 U | 10/1987 | | |
| JP | H8-238604 A | 9/1996 | | |

OTHER PUBLICATIONS

EP-2062699-A2 English Translation; May 2009 Schmid Olaf B27G19/04.*

JPS58410U English Translation; Oct. 1981 B27G19/04.*

DE 1086036 B English Translation Jul. 1960; Kaltenmark Otto ; B27G19/04.*

* cited by examiner

PORTABLE CUTTING MACHINE

CROSS-REFERENCE TO RELATED APPLICATIONS

This application claims the benefit of priority to Japanese Patent Application No. 2019-160408, filed on Sep. 3, 2019, the entire contents of which are hereby incorporated by reference.

BACKGROUND

1. Technical Field

The present invention relates to a portable cutting machine.

2. Description of the Background

Portable cutting machines commonly have a movable cover covering a blade. The movable cover is rotated to be open. During a cutting operation in which the cutting machine is moved forward to cut into the workpiece, the movable cover is open as it is pushed by an edge of the workpiece facing the movable cover. However, the movable cover may not be open smoothly at the beginning of the cutting operation depending on the material of the workpiece or the manner of cutting. Some cutting machines include a mechanism to manually assist the initial opening of the movable cover. A cutting machine described in Japanese Unexamined Patent Application Publication No. 8-238604 (hereafter, Patent Literature 1) includes a rotatable lever. When the lever is rotated, a wire connected to a movable cover is pulled to open the movable cover. A cutting machine described in Japanese Unexamined Utility Model Application Publication No. 62-162003 (hereafter, Patent Literature 2) includes an operation member that is linearly slidable. When the operation member is pulled, a lever connected to a movable cover is rotated to pull and open the movable cover.

BRIEF SUMMARY

The operability of the cutting machines described in Patent Literatures 1 and 2 is to be improved. For the cutting machine described in Patent Literature 1, the movable cover has the wire anchored near the rotation center of the cover. The lever is operated with a larger force. However, the lever operation part located farther from the rotation center of the lever is to be displaced by a larger amount to open the movable cover. For the cutting machine described in Patent Literature 2, the operation member is pulled linearly. This operation member cannot be operated easily, for example, with fingers while the user is holding the cutting machine by both hands, lowering the operability. The operation member may have a higher degree of design freedom in, for example, the position and the amount of displacement of the operation part, and the force used for operation.

An aspect of the present invention provides a portable cutting machine, including:
 a base;
 an electric motor;
 a blade rotatable by the electric motor;
 a movable cover covering a lower part of the blade protruding downward from the base, the movable cover being rotatable to be open;
 an operation lever located frontward from a rotation center of the blade, the operation lever being rotatable; and
 a transmission lever rotatable to push and open the movable cover when pushed by the operation lever.

DETAILED DESCRIPTION

Embodiments of the present invention will be described with reference to the drawings. The same or corresponding components in the embodiments are given the same reference numerals, and will not be described.

Portable Cutting Machine

Figure 1:
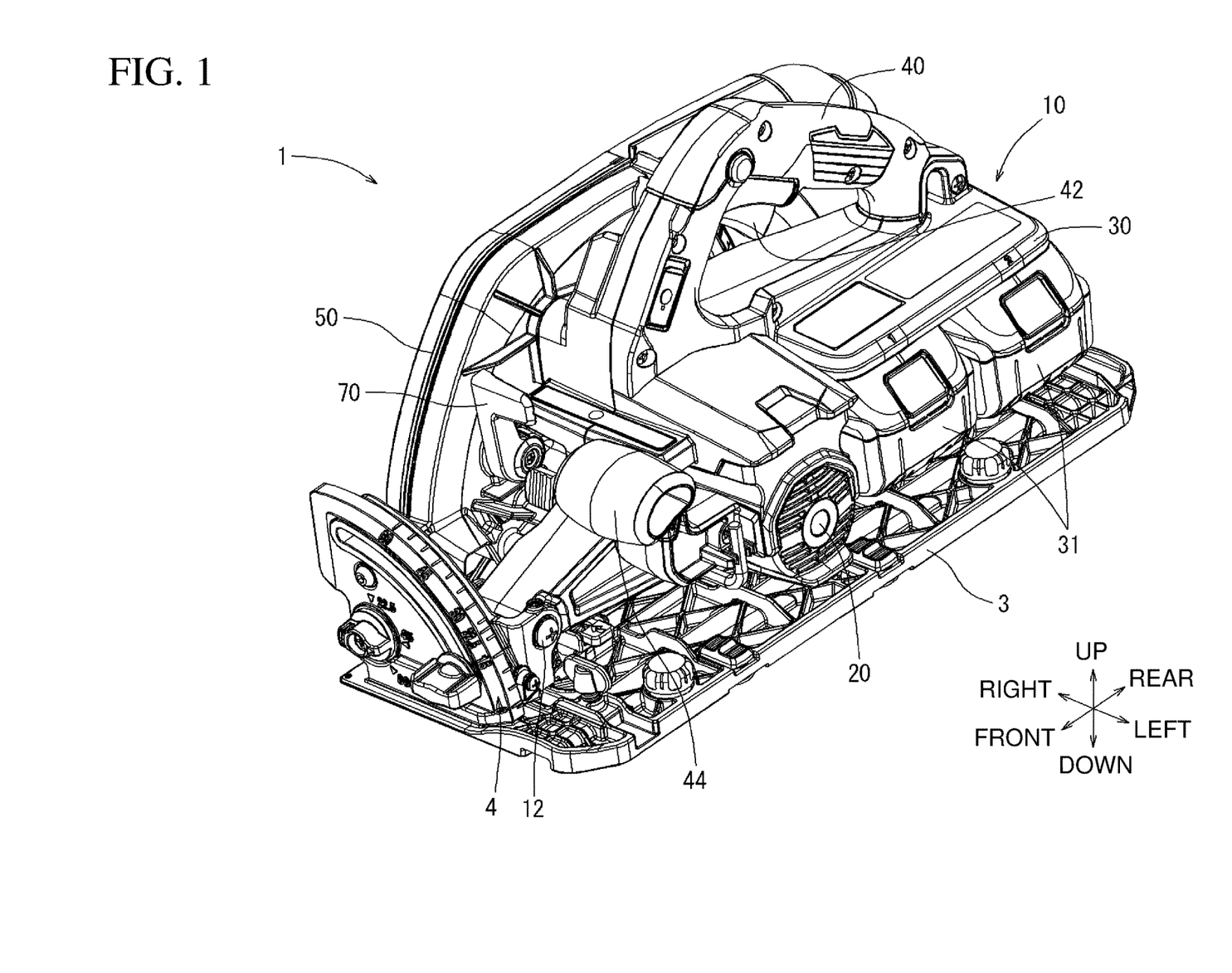
FIG. 1 is a perspective view of a portable cutting machine according to an embodiment as viewed from the left front.
Figure 2:
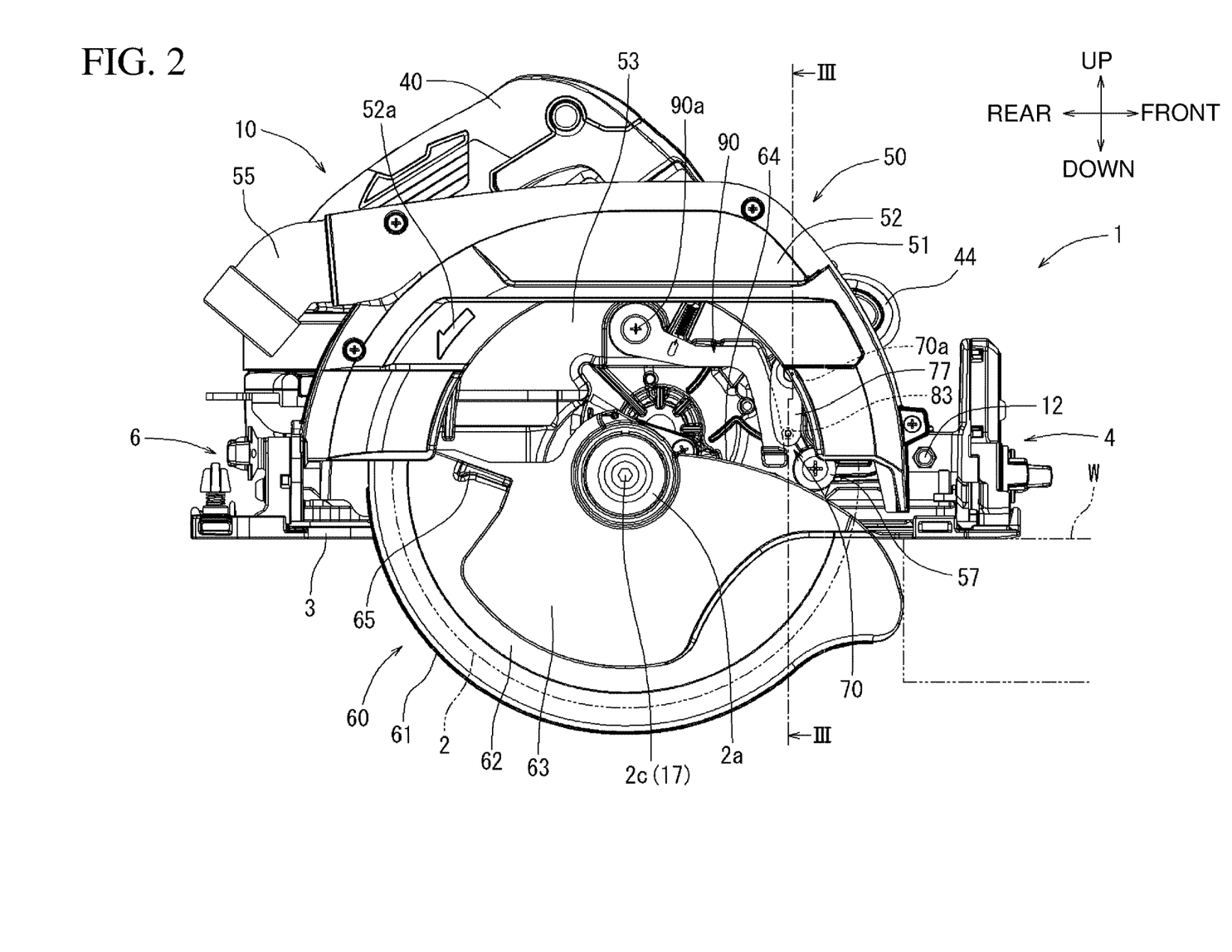
FIG. 2 is a right side view of the portable cutting machine with a movable cover at a closed position.
Figure 3:
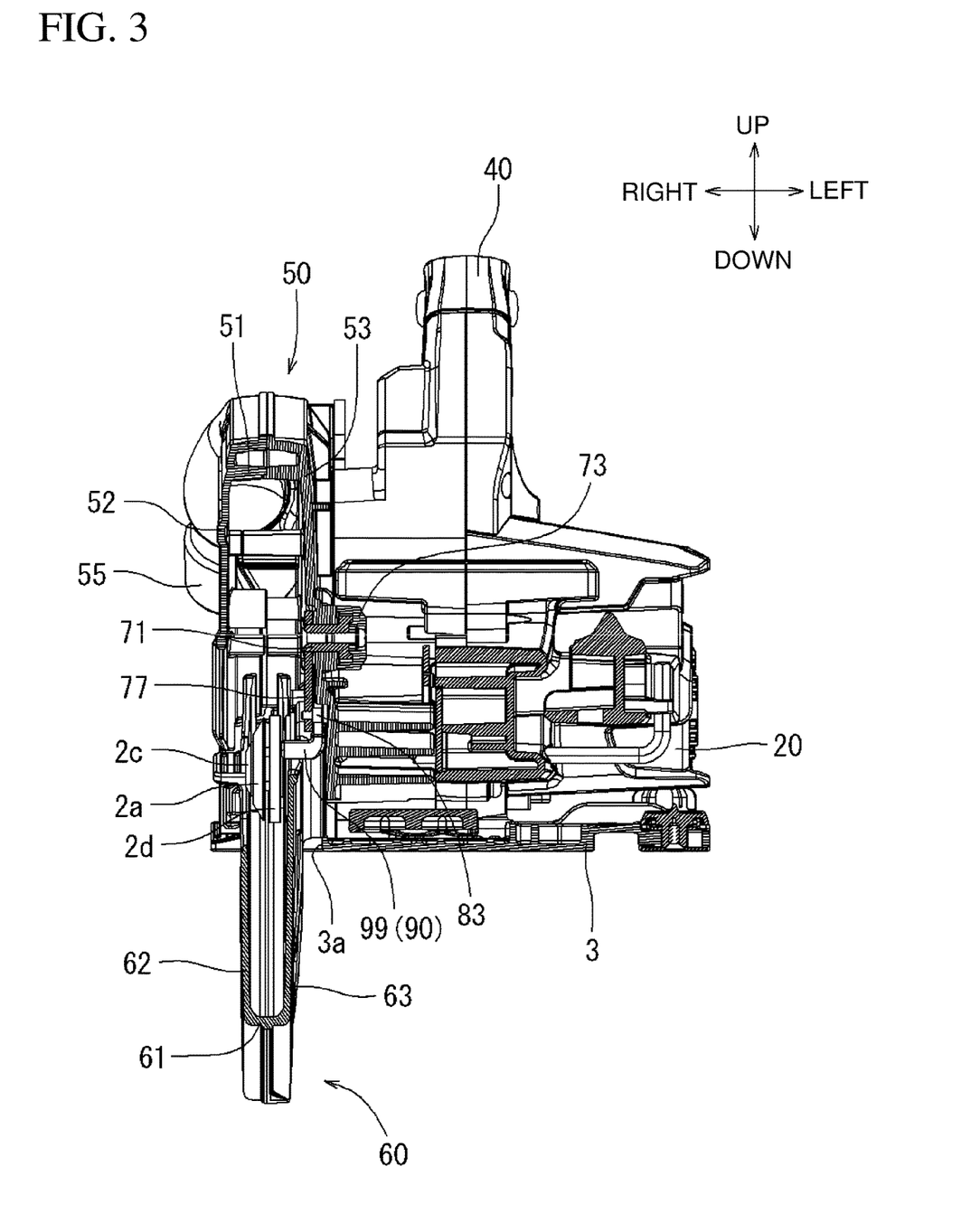
FIG. 3 is a cross-sectional view of the portable cutting machine taken along line III-III in FIG. 2.
Figure 4:
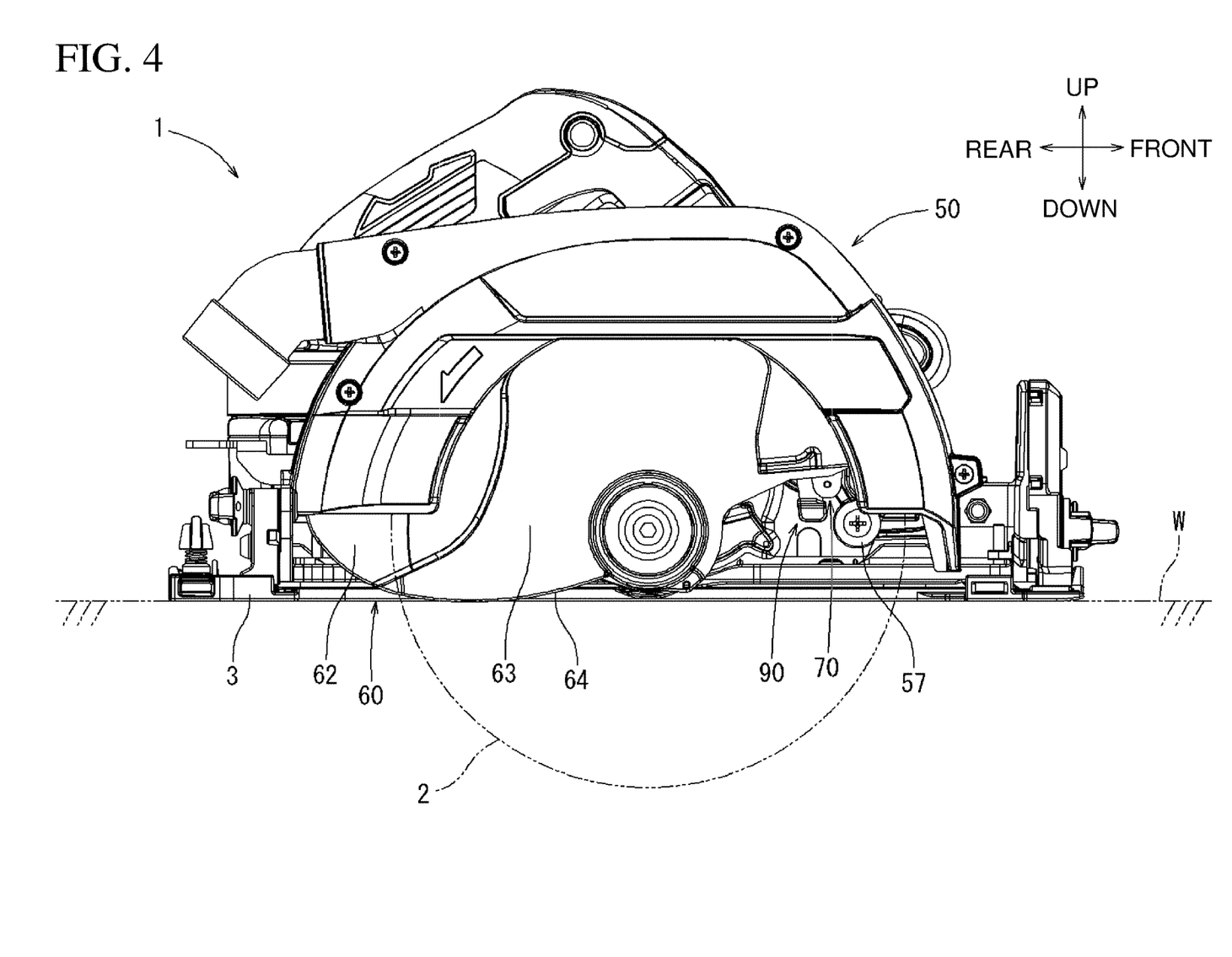
FIG. 4 is a right side view of the portable cutting machine with the movable cover at a substantially full-open position.
Figure 5:
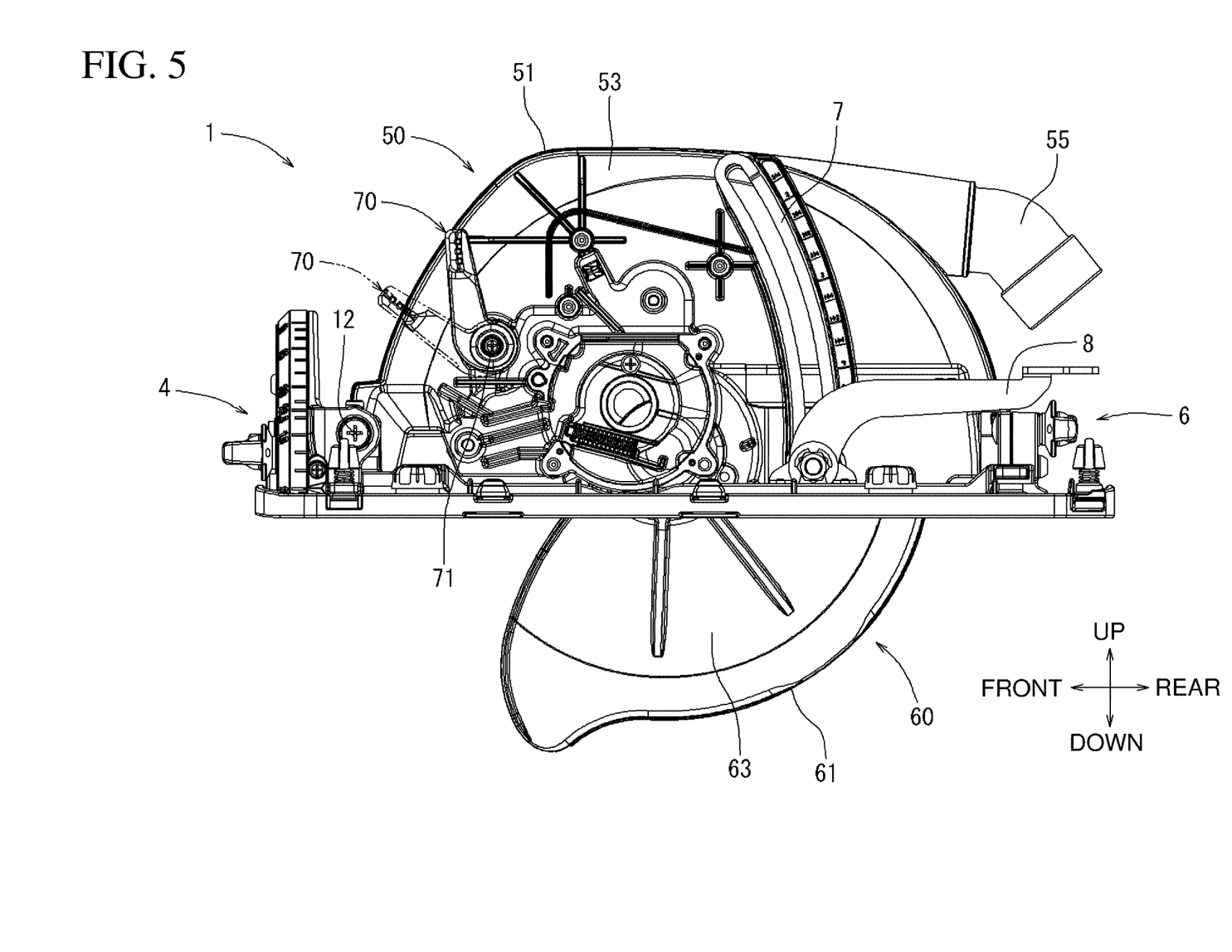
FIG. 5 is a left side view of the portable cutting machine with a body housing and a handle removed, showing the position and operation of an operation lever.
Figure 6:
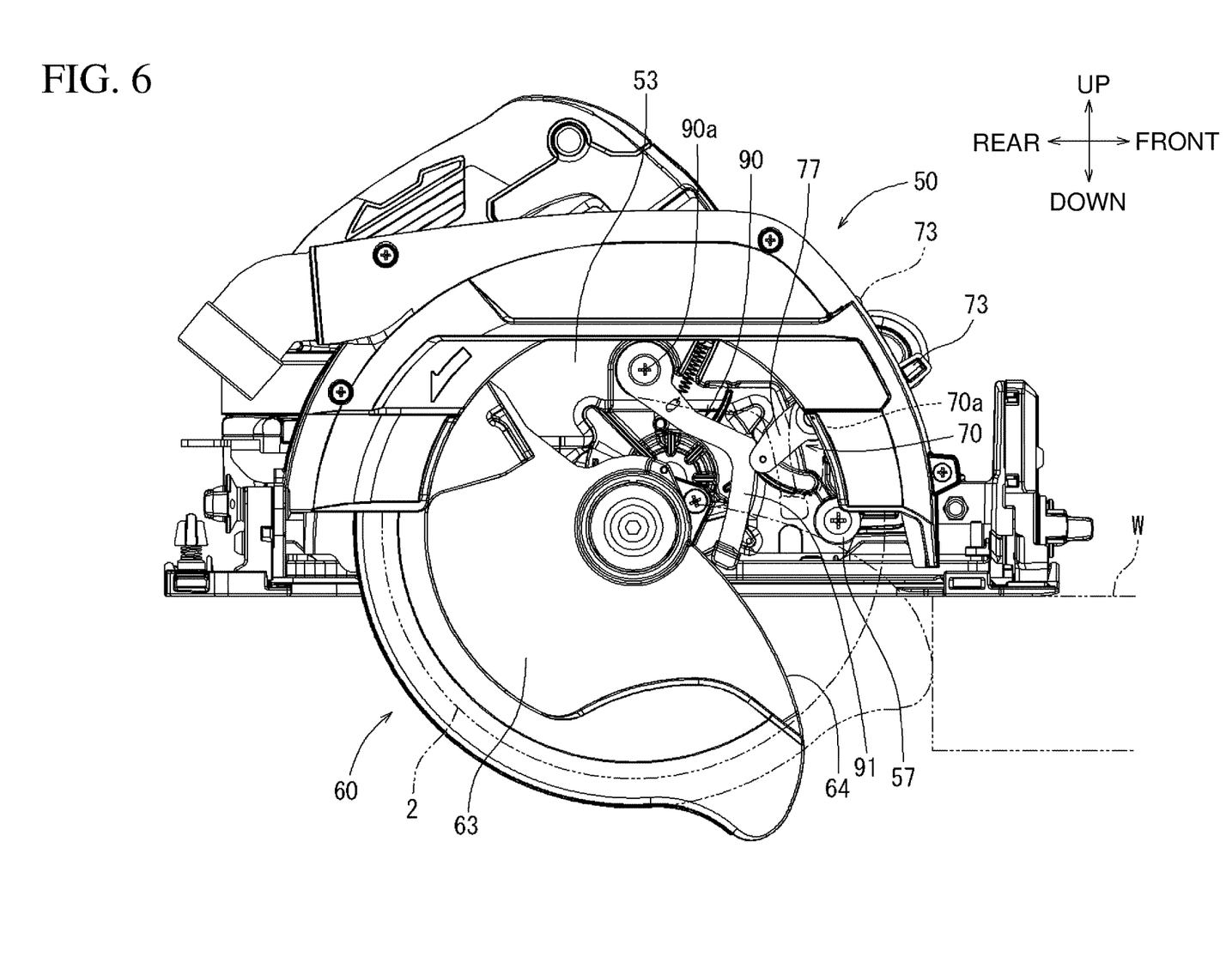
FIG. 6 is a right side view of the portable cutting machine, showing the operation of the operation lever and a transmission lever.

A portable cutting machine 1 according to an embodiment is shown in FIGS. 1 to 8. The portable cutting machine 1 includes a body 10 and a base 3. The base 3 supports the body 10. The body 10 detachably receives a disk-shaped saw blade (cutting tool) 2. The saw blade 2 is also referred to as a circular saw blade or a tipped saw. The saw blade 2 rotates using an electric motor 20 incorporated in the body 10 as a power supply. For clarity, the saw blade 2 is not shown in the drawings. In FIGS. 2, 4, and 6, the outline of the saw blade 2 is drawn using a chain line. The base 3 includes a window 3a (FIG. 3), which vertically extends through the base 3. The saw blade 2 has a lower part extending through the window 3a and protruding downward from the base 3. To cut a workpiece W, a user moves the portable cutting machine 1 forward with the base 3 being placed on the upper surface of the workpiece W. This causes the saw blade 2 protruding downward from the base 3 to cut into the workpiece W at an edge near the user.

A portable circular saw will be described as an example of a portable cutting machine according to an embodiment that can be carried by a user as a power tool used for cutting. Other examples of the portable cutting machine include a cutter with a diamond wheel. The portable cutting machine 1 includes the disk-shaped saw blade (cutting tool) 2 as described above. A portable cutting machine according to one or more embodiments including a rotary blade such as a cutter with a diamond wheel, other than the saw blade 2, may have the structure and the features described below.

As shown in FIGS. 1 to 3, the body 10 includes a loop handle 40 in its upper portion. The handle 40 protrudes upward and gripped by the user. The handle 40 includes a trigger switch lever 42 on its underside. The switch lever 42 is pulled with fingers holding the handle 40 to activate the electric motor 20, which rotates the saw blade 2. A knob 44 is located left frontward from the handle 40. The knob 44 protrudes upward and is gripped by the user. During a cutting operation, the user stands behind the portable cutting machine 1, holding the handle 40 with the right hand and gripping the knob 44 with the left hand, and moves the portable cutting machine 1 forward. The front and the rear, or the right and the left with respect to the components of the portable cutting machine 1 are herein defined as the front referring to the direction in which the cutting proceeds, and the rear referring to the direction toward the user.

Cutting Adjustment Unit

A support 4 is located on an upper front portion of the base 3. The body 10 is supported by a swing support shaft 12 in a vertically swingable manner relative to the support 4. The body 10 is vertically swingable about the swing support shaft 12 to change the degree by which the saw blade 2 protrudes downward from the base 3, allowing adjustment of the depth of cutting in the workpiece W with the saw blade 2. More specifically, when a lock lever 8 (FIG. 5) screwed in a stationary cover 50 is unscrewed, the body 10 can swing vertically along an arc-shaped depth guide 7 (FIG. 5) attached to the base 3. This allows adjustment of the depth of cutting with the saw blade 2 attached to the body 10. When the lock lever 8 is screwed into the stationary cover 50 at an intended position, the depth guide 7 is fastened to lock the body 10 on the base 3. A support 6 is located on an upper rear portion of the base 3. The body 10 is supported by tilt support shafts included in the supports 4 and 6 at the front and the rear and is thus laterally tiltable relative to the base 3. The body 10 is laterally tiltable about the tilt support shafts to adjust the angle of cutting in the workpiece W with the saw blade 2.

Electric Motor

The body 10 includes the electric motor 20. The electric motor 20 has the rotation axis in the lateral direction. The electric motor 20 includes a motor shaft for outputting rotational power. The motor shaft has two ends supported in a rotatable manner by bearings fixed on the body housing. A spindle 17, to which the saw blade 2 is attached, extends parallel to the motor shaft. The spindle 17 is supported in a rotatable manner by bearings fixed on the body housing. A reduction gear train for reducing the rotation from the electric motor 20 is located between the electric motor 20 and the spindle 17. The spindle 17 has a distal end protruding into the stationary cover 50. The saw blade 2 is attached to the protruding end of the spindle 17. The saw blade 2 is held between an outer flange 2a and an inner flange 2d (FIG. 3). The saw blade 2 is fastened with a fixing bolt 2c screwed into the front face of the spindle 17. The saw blade 2 is thus fixed in a manner nonrotatable relative to the spindle 17.

Battery Mount

As shown in FIG. 1, a battery mount 30 to which battery packs 31 are attachable is located rearward from the electric motor 20. The battery packs 31 serve as a power supply for the portable cutting machine 1. The battery mount 30 may receive the battery packs 31 on its lower surface. The battery packs 31 may each be, for example, a rechargeable lithium-ion battery that is repeatedly usable. In another embodiment, the power tool may use a 100-volt alternating-current (AC) utility power, in place of the battery mount 30.

Stationary Cover

As shown in FIGS. 1 to 3, the body 10 includes the metal stationary cover 50. The stationary cover 50 covers substantially the upper half of the saw blade 2. The stationary cover 50 is substantially semicircular.

The stationary cover 50 includes a peripheral wall 51, a side wall 52, and a side wall 53. The peripheral wall 51 covers the periphery of the flat surface of the saw blade 2. The side wall 52 covers an external surface (a surface opposite to the motor) of a cutting edge. The side wall 53 is integrally connected to the body housing at an internal surface (a surface adjacent to the motor) of the cutting edge. The external side wall 52 extends radially inward from the peripheral wall 51 over the external surface of the saw blade 2. An arrow 52a on the external side wall 52 of the stationary cover 50 indicates the rotation direction of the saw blade 2.

The stationary cover 50 includes a dust discharge channel 55. The dust discharge channel 55 extends from an inlet opening in the internal surface of the peripheral wall 51 of the stationary cover 50 to an outlet opening at the rear of the stationary cover 50. As the saw blade 2 rotates, dust such as chips from the workpiece W is blown upward, flows rearward inside the stationary cover 50 in air blow caused by the rotating saw blade 2, and is discharged outside through the dust discharge channel 55.

Movable Cover

As shown in FIGS. 1 to 3, a movable cover 60 is attached to the body 10. The movable cover 60 covers substantially the lower half of the saw blade 2. The movable cover is formed from, for example, aluminum. The movable cover 60 is supported in a rotatable manner about the same rotation axis as the saw blade 2. The movable cover 60 is rotated to be open or closed. More specifically, the movable cover 60 is open first at the front, and then along the bottom toward the rear. As shown in FIG. 2, the movable cover 60 is open clockwise as viewed from the right of the portable cutting machine 1.

The movable cover 60 includes a peripheral wall 61, a side wall 62, and a side wall 63. The peripheral wall 61 covers the periphery of the saw blade surface. The side wall 62 covers an external surface (a surface opposite to the motor) of the saw blade 2. The side wall 63 covers an internal surface (a surface adjacent to the motor) of the saw blade 2. The movable cover 60 is urged in the closing direction by a spring (not shown) to cover substantially the lower half of the saw blade 2 when the cutting operation is not performed.

The stationary cover 50 includes a stopper 57 protruding outward from the side wall 53. Urged in the closing direction, the movable cover 60 at a closed position has the side wall 63 in contact with the stopper 57, and is restricted from rotating any further. When the movable cover 60 is open against the urging force from the spring, the movable cover 60 is retracted into a space between the saw blade 2 and the stationary cover 50.

Movement of Movable Cover during Cutting

When the saw blade 2 cuts into the workpiece W forward with the base 3 being placed on the upper surface of the workpiece W as shown in FIGS. 2 and 4, the movable cover 60 is pressed against the edge of the workpiece W near the user and rotates in the opening direction. When the saw blade 2 cuts into the workpiece W further, the movable cover 60 is rotated further in the opening direction and moves over the upper surface of the workpiece W. The movable cover 60 moved entirely over the upper surface of the workpiece W is at an opening position (FIG. 4) of the movable cover 60. The movable cover 60 may also be open manually with a tab 65 on the movable cover 60 to the full-open position.

Open Assist Unit for Movable Cover

The movable cover 60 may not be open smoothly when simply pushed rearward by the workpiece W, depending on the material of the workpiece W or the manner of cutting. In this case, an open assist unit described below can assist the movable cover 60 to start opening. The open assist unit includes an operation lever 70 and a transmission lever 90. The operation lever 70 is operable by the user. The transmission lever 90 transmits the movement of the operation lever 70 to the movable cover 60. The operation lever 70 and the transmission lever 90 are both supported by the stationary cover 50 in a rotatable manner. The operation lever 70 pushes the transmission lever 90 to rotate the transmission lever 90. The rotating transmission lever 90 pushes the movable cover 60 to open the movable cover 60.

Operation Lever

Figure 7:
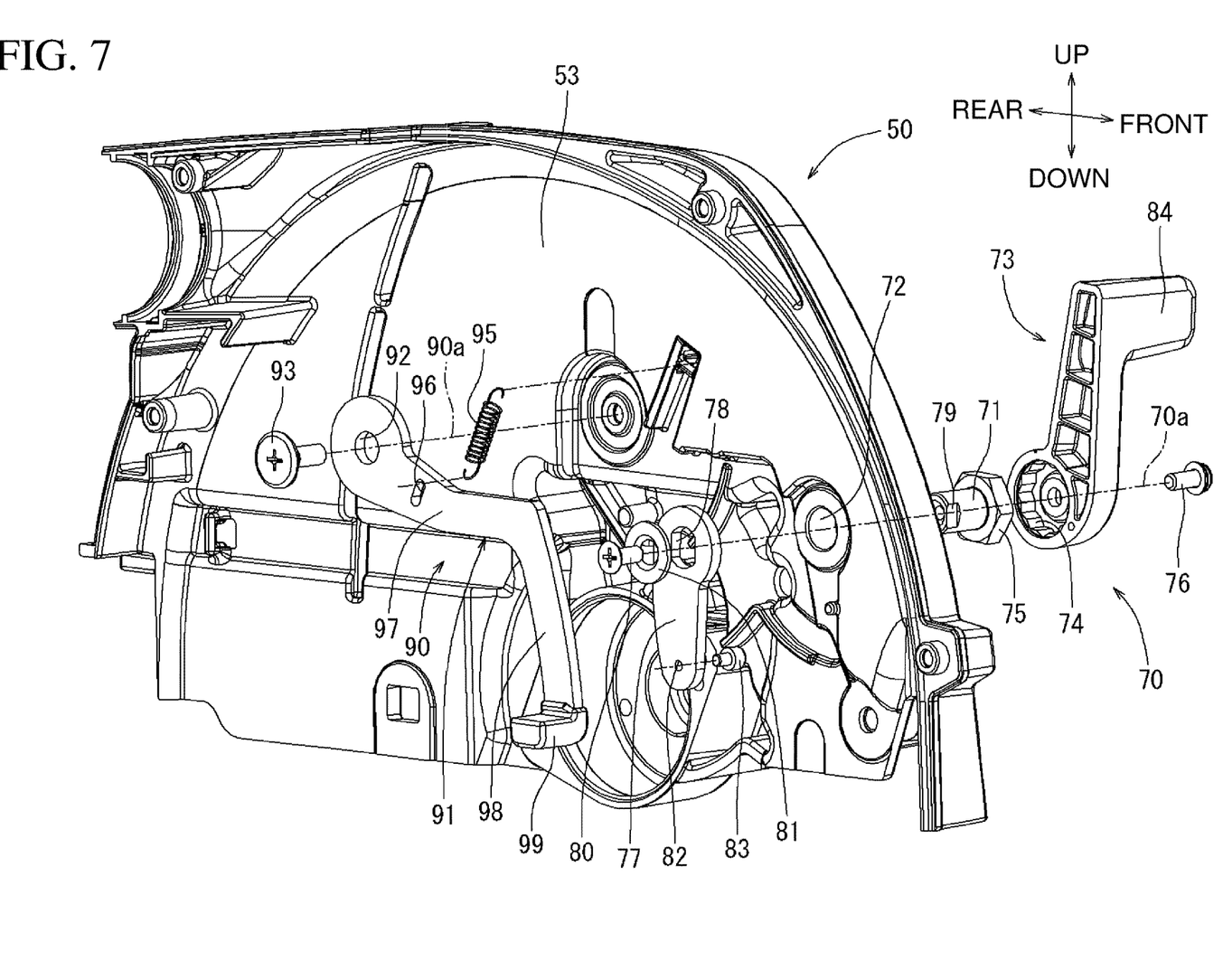
FIG. 7 is an exploded perspective view of the operation lever and the transmission lever as viewed from the right front of the portable cutting machine.
Figure 8:
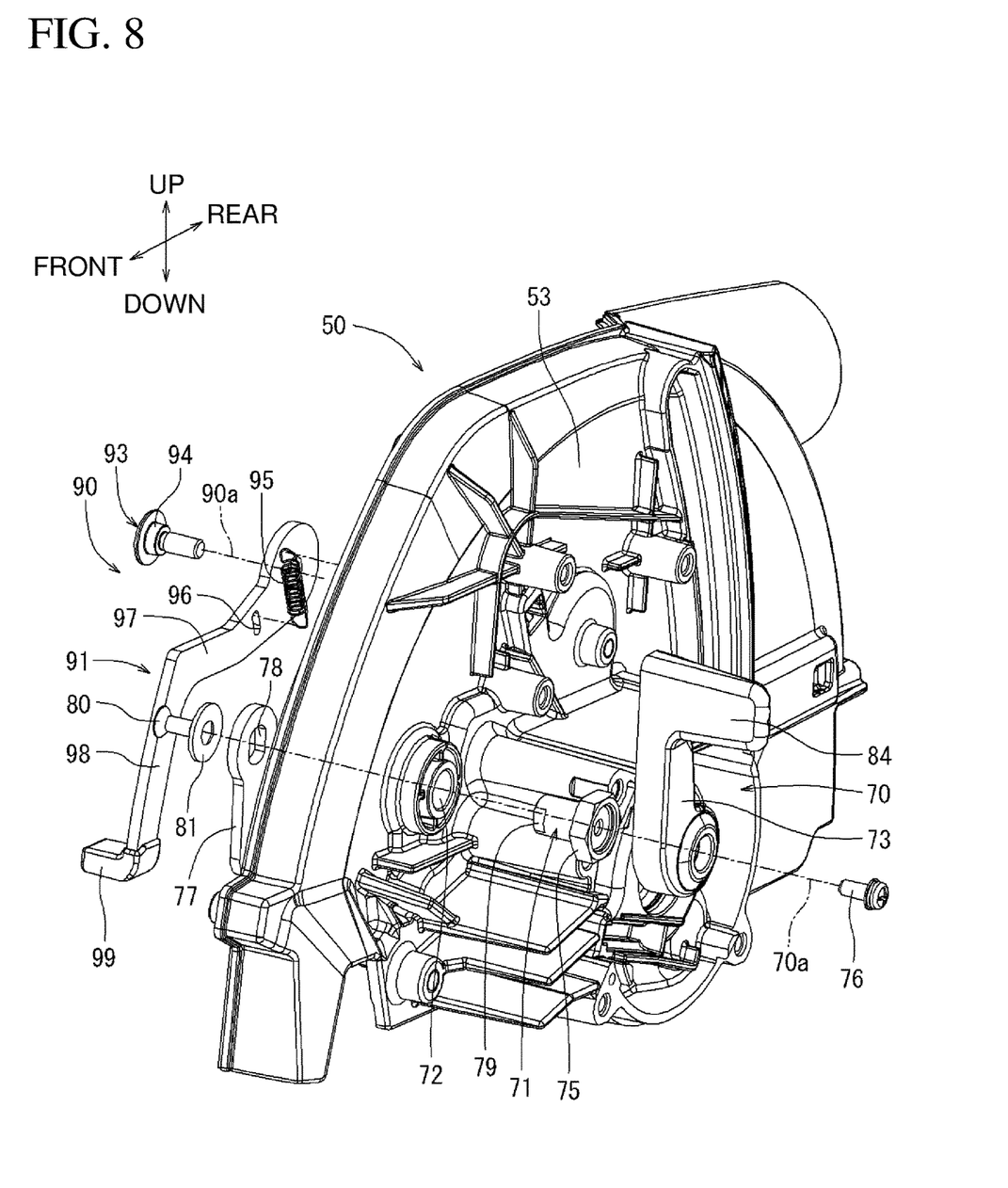
FIG. 8 is an exploded perspective view of the operation lever and the transmission lever as viewed from the left front of the portable cutting machine.

As shown in FIGS. 7 and 8, the operation lever 70 includes a rotational shaft (shaft) 71. The operation lever 70 is supported in a rotatable manner by the rotational shaft 71 received in a support hole 72 in the side wall 53 of the stationary cover 50. The operation lever 70 includes an operation arm 73 operated with hand by the user. The operation arm 73 is mounted onto the rotational shaft 71 outside the stationary cover 50. The operation arm 73 includes an operation part 84 protruding from its distal end and parallel to the rotation axis. The operation arm 73 has a recess on its basal end. The recess on the operation arm 73 has serrations 74 on its inner peripheral wall. The serrations 74 are fitted with a hexagon head 75 of the rotational shaft 71. The operation arm 73 is fastened to the head 75 of the rotational shaft 71 with a mount screw 76 extending through the basal end. The rotational shaft 71 extends through the stationary cover 50, eliminating any slit for receiving the operation arm 73 in the stationary cover 50. This prevents chips from coming out of the stationary cover 50 through such a slit.

The operation lever 70 is located frontward from the rotation center of the saw blade 2. The operation arm 73 is particularly located on the right of the knob 44 as shown in FIG. 1. The user can operate the operation lever 70 by pulling down the operation arm 73 frontward with the thumb of the left hand while gripping the knob 44 with the left hand. The transmission lever 90 is located between the operation lever 70 and the movable cover 60. The operation lever 70 has a shorter length from a rotation center 70a in the radial direction than an operation lever 70 used directly for opening the movable cover 60. Thus, the operation part 84 of the operation lever 70 is displaced by a smaller amount.

The operation lever 70 includes an output arm 77. The output arm 77 is mounted onto the rotational shaft 71 inside the stationary cover 50. The operation lever 70 rotates the transmission lever 90 with the output arm 77 pushing the transmission lever 90. The output arm 77 has a fitting hole 78 in its basal end. The fitting hole 78 receives the rotational shaft 71. The cylindrical rotational shaft 71 has two flat portions 79 on its opposite side surfaces. The fitting hole 78 in the output arm 77 is shaped complementarily to the two flat portions 79 on the side surfaces of the rotational shaft 71. The output arm 77 is thus nonrotatable relative to the rotational shaft 71.

The output arm 77 is mounted onto an end of the rotational shaft 71 with a fixing screw 80. The fixing screw 80 holds the output arm 77 onto the rotational shaft 71 via a washer 81 larger than the fitting hole 78 in the output arm 77. The output arm 77 has a screw hole 82 in its distal end. The screw hole 82 receives a hexagon socket bolt 83 to fasten the output arm 77. The hexagon socket bolt 83 includes a head with a cylindrical side surface that is smooth without irregularities. The operation lever 70 pushes the transmission lever 90 with the side surface of the hexagon socket bolt 83. The operation lever 70 is thus highly slidable with the transmission lever 90. The output arm 77 is shorter than the operation arm 73. The operation lever 70 is thus operable with a smaller force. The output arm 77 extends in a direction substantially opposite to the operation arm 73 about the rotation center 70a. However, the operation arm 73 can be mounted at any angles as appropriate using the serrations 74.

Transmission Lever

As shown in FIG. 6, the transmission lever 90 includes an arm 91. The arm 91 extends from a basal end of the transmission lever 90 and between the rotation center 70a of the operation lever 70 and a rotation center 90a of the transmission lever 90. The operation lever 70 rotates the transmission lever 90 with the output arm 77 pushing the arm 91. As shown in FIGS. 7 and 8, the arm 91 has a shaft hole 92 in its basal end. The shaft hole 92 receives a stepped screw 93 serving as a pivot shaft for the transmission lever 90. The stepped screw 93 is screwed into a screw hole in the side wall 53 of the stationary cover 50. The transmission lever 90 is supported on the stationary cover 50 with the stepped screw 93 through its shank 94 in a rotatable manner. The transmission lever 90 has the rotation center 90a located rearward from the rotation center 70a of the operation lever 70. This allows use of space rearward from the operation lever 70.

The transmission lever 90 is urged in a direction in which the arm 91 is raised frontward by a tension spring 95 anchored to the side wall 53 of the stationary cover 50 (counterclockwise as viewed from the right of the portable cutting machine). The tension spring 95 has an end hooked in a hole 96 near the basal end of the arm 91. This structure allows the transmission lever 90 to return to the initial position under the urging force from the tension spring 95 when the movable cover 60 is open to a certain degree and the operation lever 70 is left unoperated. The transmission lever 90 then pushes the operation lever 70 to return to the initial position (FIG. 4).

The arm 91 includes a front extension 97 and a downward extension 98. The front extension 97 extends frontward from the rotation center 90a. The downward extension 98 extends downward from a distal end of the front extension 97. The operation lever 70 pushes the front face of the downward extension 98 to rotate the transmission lever 90. The operation lever 70 thus continuously pushes the transmission lever 90 at a position farther from the rotation center 90a of the transmission lever 90, efficiently transmitting the power from the operation lever 70 to the transmission lever 90.

As shown in FIGS. 2 and 6, the arm 91 is shaped to have a shorter distance from the rotation center 90a of the transmission lever 90 to a contact between the arm 91 and the operation lever 70 in response to a higher degree of opening of the movable cover 60. The operation lever 70 transmits power efficiently to the transmission lever 90 at the beginning of the rotation.

The transmission lever 90 has a rotation angle smaller than the rotation angle of the operation lever 70 when the movable cover 60 is to be open. The operation part is thus operable with a smaller force. This can be explained by the theory in power transmission that the product of the number of rotations (rotational speed) and the torque remains the same for the driver and the follower. When the follower has a smaller number of rotations than the driver, the follower has larger torque. For example, the operation lever 70 as the driver has a rotation angle of about 53 degrees, and the transmission lever 90 as the follower has a rotation angle of about 35 degrees. In this case, the transmission lever 90 has the number of rotations about 0.66 times (35 divided by 53) the number of rotations of the operation lever 70, and thus has the torque about 1.51 times (53 divided by 35) the torque of the operation lever 70. The operation lever 70 and the transmission lever 90 rotate in the same direction as the movable cover 60 when the movable cover 60 is to be open. Thus, the operation lever 70 can be moved in the direction intuitively with higher operability.

The transmission lever 90 rotated by the operation lever 70 pushes the movable cover 60 with a distal end of the downward extension 98 of the arm 91 to open the movable cover 60. More specifically, as shown in FIG. 2, the movable cover 60 has the side wall 63 substantially semicircular and having two edges extending radially. One edge 64 faces upward when the movable cover 60 is at the closed position. The transmission lever 90 pushes the edge 64, which faces upward, downward to open the movable cover 60. The arm 91 includes the front extension 97 and the downward extension 98. The arm 91 can thus avoid interfering with the rotation center (e.g., spindle) of the movable cover 60 when the transmission lever 90 moves, and can effectively push the movable cover 60 farther.

As shown in FIGS. 7 and 8, the transmission lever 90 includes a slider 99. The slider 99 slides on the movable cover 60 while the transmission lever 90 is pushing the movable cover 60. The slider 99 extends from the distal end of the downward extension 98 toward the saw blade. The slider 99 is formed from a synthetic resin, such as a polyacetal resin. The transmission lever 90 may be formed from a metal, such as an iron-based material, excluding the slider 99. The transmission lever 90 is thus highly slidable on the movable cover 60. The movable cover 60 may eliminate a modification of, for example, forming the edge 64 from a different material. In this design, the slidability is maintained in opening the movable cover 60 with the workpiece W in contact with the movable cover 60. In another embodiment, the slider 99 may be coated with a synthetic resin (not shown) on its surface.

As shown in FIGS. 2 and 6, the contact between the movable cover 60 and the transmission lever 90 shifts rearward in response to a higher degree of opening of the movable cover 60. The transmission lever 90 pushing the movable cover 60 thus does not protrude downward from the base in response to the opening of the movable cover 60. The movable cover 60 has a shorter distance from the rotation center of the movable cover 60 to the contact between the movable cover 60 and the transmission lever 90 in response to a higher degree of opening of the movable cover 60. The transmission lever 90 transmits power efficiently to the movable cover 60 at the beginning of the rotation.

As shown in FIG. 2, the transmission lever 90 is out of contact with the movable cover 60 when the movable cover 60 is at the closed position. The movable cover 60 may thus be at the closed position independent of the movable area of the transmission lever 90. This reduces manufacturing variations for the closed position.

Figure 9:
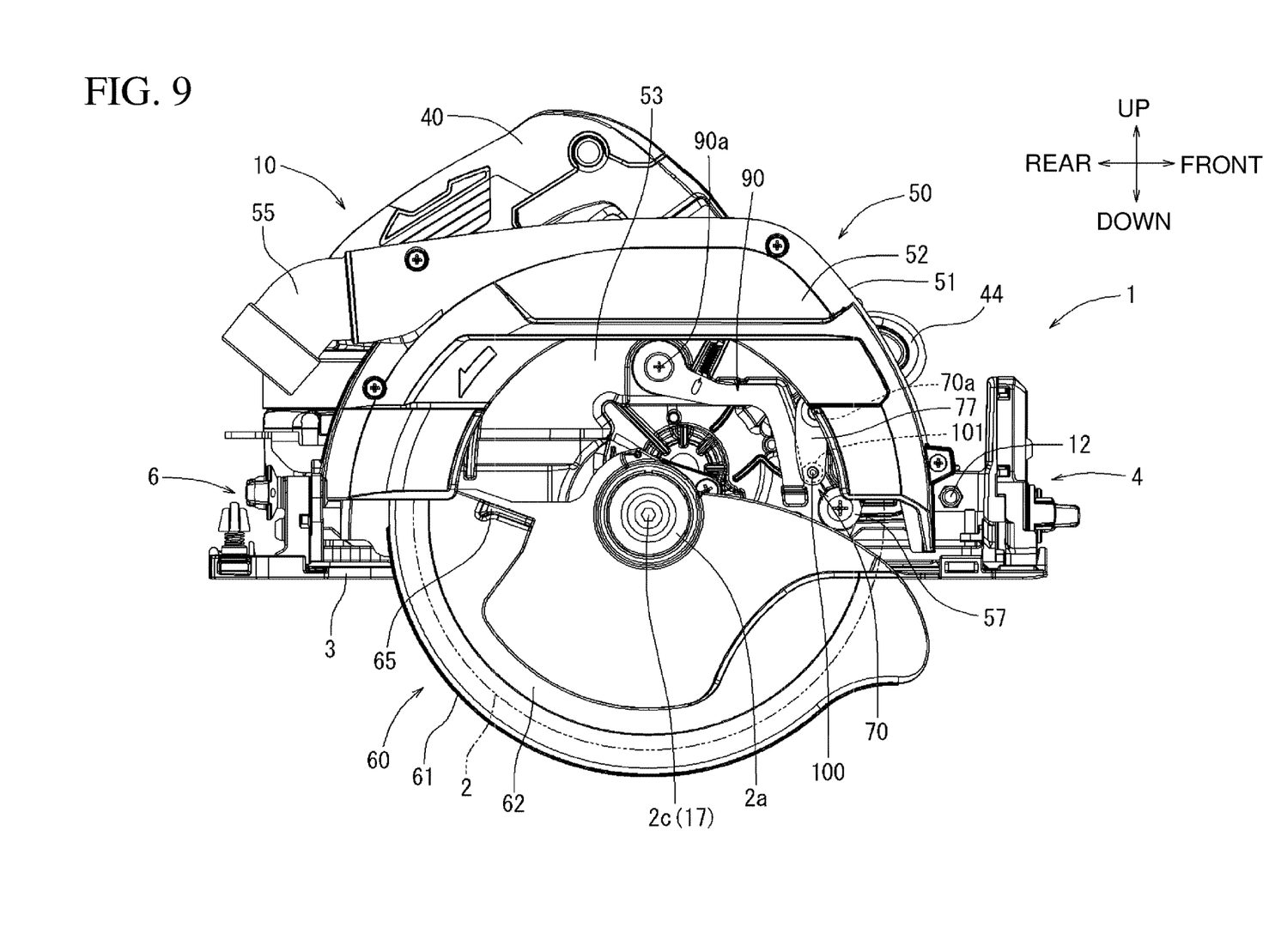
FIG. 9 is a right side view of a portable cutting machine according to another embodiment.
Figure 10:
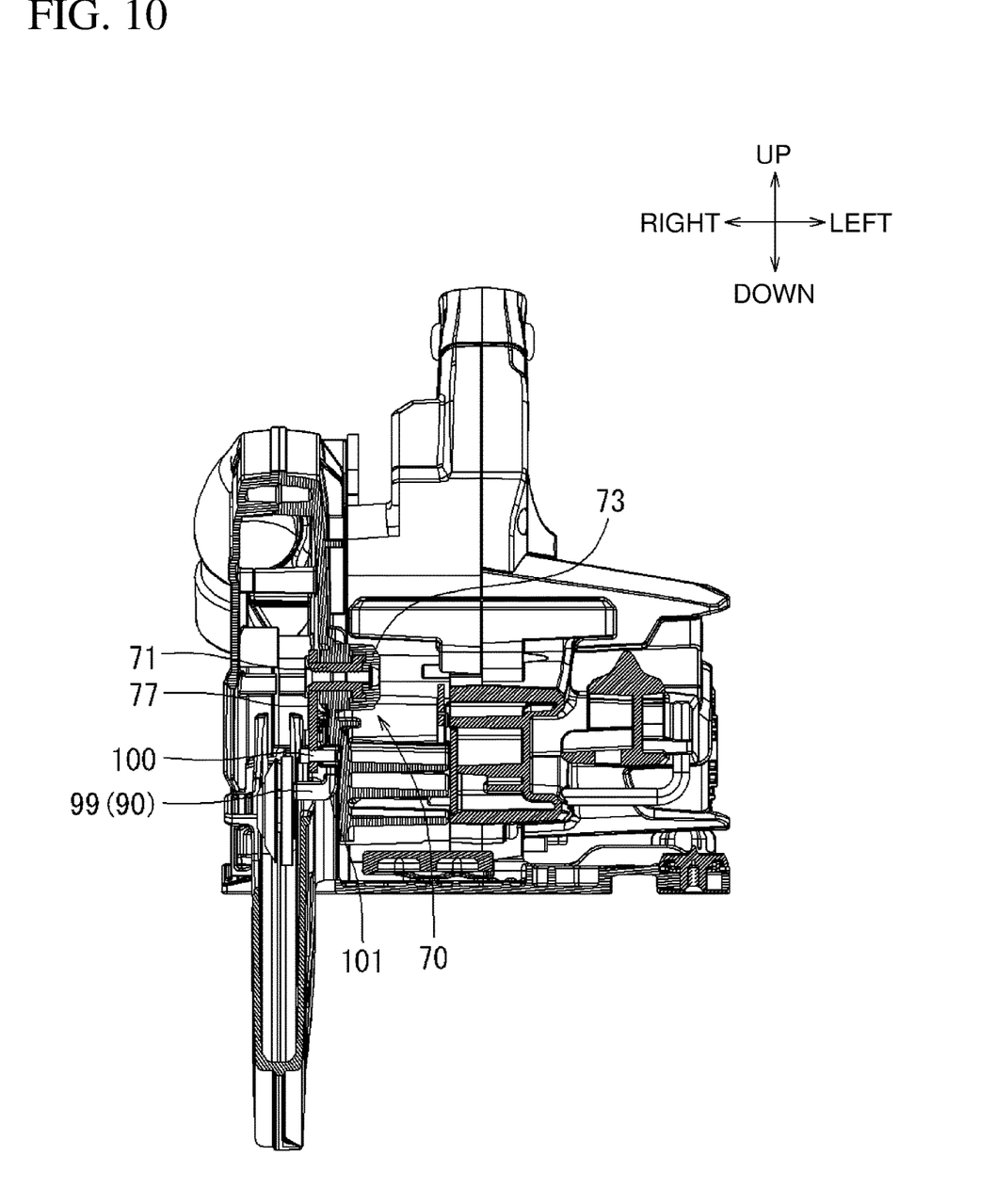
FIG. 10 is a cross-sectional view of the portable cutting machine in FIG. 9, taken along the same line as in FIG. 3.

In another embodiment shown in FIGS. 9 and 10, the operation lever 70 may include a rolling member, such as a needle bearing, in place of the hexagon socket bolt 83 described above. The output arm 77 has a small hole in its basal end. A support shaft 100 is fitted into the small hole and is fixed. A needle bearing 101 is fitted onto the protruding portion of the support shaft. As the operation lever 70 pushes the transmission lever 90, the needle bearing rolls over the transmission lever 90. This improves slidability between the operation lever 70 and the transmission lever 90.

Although the embodiments of the prevent invention are described above specifically, the invention is not limited to these embodiments. The embodiments may be variously substituted, modified, or altered by those skilled in the art without departing from the scope of the invention.

REFERENCE SIGNS LIST

W workpiece
1 portable cutting machine
2 saw blade
2a outer flange
2d inner flange
2c fixing bolt
3 base
3a window
4, 6 support
7 depth guide
8 lock lever
10 body
12 swing support shaft
17 spindle
20 electric motor
30 battery mount
31 battery pack
40 handle
42 switch lever
44 knob
50 stationary cover
51 peripheral wall
52 external side wall
53 internal side wall
55 dust discharge channel
57 stopper
60 movable cover
61 peripheral wall
62 external side wall
63 internal side wall
64 edge
65 tab
70 operation lever
70a rotation center of operation lever
71 rotational shaft
72 support hole
73 operation arm
74 serration
75 head
76 mount screw
77 output arm
78 fitting hole
79 flat portion
80 fixing screw
81 washer
82 screw hole
83 hexagon socket bolt
84 operation part
90 transmission lever
90a rotation center of transmission lever
91 arm
92 shaft hole
93 stepped screw
94 shank
95 tension spring 96 hole
97 front extension
98 downward extension
99 slider
100 support shaft
101 needle bearing

What is claimed is:

1. A portable cutting machine, comprising:
a base;
an electric motor supported by the base;
a blade rotatable by the electric motor and having a rotational axis;
a stationary cover covering an upper part of the blade;
a movable cover (1) covering a lower part of the blade protruding downward from the base in a closed position and (2) being rotatable to be opened from the closed position;
an operation lever (1) located frontward from a rotation center of the blade, (2) being rotatable and (3) configured to be operated by a hand of a user of the portable cutting machine; and
a rotatable transmission lever, wherein:
the rotatable transmission lever includes a rotation axis and a rotatable arm extending from and rotatable around the rotation axis;
the operation lever includes
an operation arm, and
an output arm shorter than the operation arm;
the output arm is configured such that the output arm pushes and rotates the rotatable transmission lever when the operation lever is rotated in a first direction;
the operation lever includes a shaft extending through the stationary cover;
the operation arm is connected to the shaft outside the stationary cover along the rotational axis of the blade;
the output arm is connected to the shaft inside the stationary cover along the rotational axis of the blade; and
the operation lever, the rotatable transmission lever and the movable cover are configured such that:
when the operation lever is rotated in a first direction, the operation lever contacts and rotates the rotatable arm of the rotatable transmission lever and rotation of the rotatable arm of the rotatable transmission lever moves the movable cover from the closed position to be opened; and
a distance from the rotation axis of the rotatable transmission lever to a contact point between the operation lever and the rotatable arm of the rotatable transmission lever decreases as a distance the movable cover moves from the closed position increases.

2. The portable cutting machine according to claim 1, wherein
the rotation axis of the rotatable transmission lever is rearward from a rotation center of the operation lever.

3. The portable cutting machine according to claim 2, wherein
the rotatable transmission lever and the operation lever are configured such that the rotatable transmission lever has a smaller rotation angle than a rotation angle of the operation lever when the operation lever and the rotatable transmission lever are operated to open the movable cover.

4. The portable cutting machine according to claim 1, wherein
the rotatable arm includes
a front extension extending frontward from the rotation axis of the rotatable transmission lever, and
a downward extension extending downward from a distal end of the front extension, and
the rotatable transmission lever and the movable cover are configured such that the rotatable transmission lever pushes the movable cover with a distal end of the downward extension to open the movable cover.

5. The portable cutting machine according to claim 4, wherein
the operation lever and the rotatable transmission lever are configured such that the operation lever pushes a front face of the downward extension to rotate the rotatable transmission lever.

6. The portable cutting machine according to claim 1, wherein
the rotatable transmission lever and the operation lever are configured such that the rotatable transmission lever has a smaller rotation angle than a rotation angle of the operation lever when the operation lever and the rotatable transmission lever are rotated to open the movable cover.

7. The portable cutting machine according to claim 1, wherein
the operation lever, the rotatable transmission lever and the movable cover are configured such that the operation lever, the rotatable transmission lever and the movable cover rotate in the same direction to open the movable cover.

8. The portable cutting machine according to claim 1, wherein
the movable cover and the rotatable transmission lever are configured such that a distance from a rotation center of the movable cover to a contact between the movable cover and the rotatable transmission lever decreases as the distance the movable cover moves from the closed position increases.

9. The portable cutting machine according to claim 1, wherein
the movable cover and the rotatable transmission lever are configured such that a contact between the rotatable transmission lever and the movable cover moves rearward as the distance the movable cover moves from the closed position increases.

10. The portable cutting machine according to claim 1, wherein
the stationary cover includes a stopper, and
the rotatable transmission lever, the movable cover and the stopper are configured such that the rotatable transmission lever is out of contact with the movable cover when the movable cover is at a closed position determined by contact of the movable cover and the stopper.

11. The portable cutting machine according to claim 1, wherein
the rotatable transmission lever includes a slider comprising a synthetic resin, and
the rotatable transmission lever and the movable cover are configured such that the slider slides on the movable cover when the rotatable transmission lever pushes the movable cover.

12. The portable cutting machine according to claim 11, wherein
the slider comprises a polyacetal resin.

13. The portable cutting machine according to claim 1, wherein
the operation lever includes a cylindrical member having a side surface configured to contact the rotatable transmission lever.

14. The portable cutting machine according to claim 1, wherein
the operation lever includes a rolling member, and
the operation lever and the rotatable transmission lever are configured such that the rolling member rolls over the rotatable transmission lever when the operation lever pushes the rotatable transmission lever.

\* \* \* \* \*